(12) United States Patent
Palmer, Jr. et al.

(10) Patent No.: US 9,487,698 B2
(45) Date of Patent: Nov. 8, 2016

(54) METHOD FOR IMPROVING THE WATER TRANSPORT CHARACTERISTICS OF HYDROPHOBIC SURFACES

(75) Inventors: Charles Francis Palmer, Jr., Greer, SC (US); Calvin M. Wicker, Jr., Spartanburg, SC (US)

(73) Assignee: Ethox Chemicals, LLC, Greenville, SC (US)

( * ) Notice: Subject to any disclaimer, the term of this patent is extended or adjusted under 35 U.S.C. 154(b) by 1015 days.

(21) Appl. No.: 12/010,325

(22) Filed: Jan. 23, 2008

(65) Prior Publication Data

US 2008/0172937 A1    Jul. 24, 2008

Related U.S. Application Data

(60) Provisional application No. 60/897,047, filed on Jan. 24, 2007.

(51) Int. Cl.
| | | |
|---|---|---|
| C09K 17/14 | (2006.01) | |
| C08G 67/00 | (2006.01) | |
| A01G 1/00 | (2006.01) | |
| C09K 17/18 | (2006.01) | |
| C05G 3/06 | (2006.01) | |
| A01G 13/00 | (2006.01) | |
| C08G 65/26 | (2006.01) | |
| C08G 65/332 | (2006.01) | |

(52) U.S. Cl.
CPC ............ *C09K 17/18* (2013.01); *A01G 13/0262* (2013.01); *C05G 3/06* (2013.01); *C08G 65/2609* (2013.01); *C08G 65/3322* (2013.01)

(58) Field of Classification Search
None
See application file for complete search history.

(56) References Cited

U.S. PATENT DOCUMENTS

| | | |
|---|---|---|
| 5,728,588 A | 3/1998 | Caldwell et al. |
| 5,921,023 A | 7/1999 | Ogawa et al. |
| 6,591,548 B2 | 7/2003 | Petrea et al. |
| 6,675,529 B1 | 1/2004 | Petrea et al. |
| 7,018,963 B2 | 3/2006 | Mizusaki et al. |
| 7,306,406 B2 | 12/2007 | Putnam et al. |
| 7,541,386 B2 | 6/2009 | Kostka et al. |
| 2002/0042346 A1* | 4/2002 | Hamersky et al. ............ 504/361 |
| 2003/0106261 A1* | 6/2003 | Petrea et al. ............. 47/58.1 SC |
| 2003/0115793 A1* | 6/2003 | Kostka et al. ............ 47/58.1 SC |
| 2004/0242447 A1* | 12/2004 | Mizusaki et al. ............. 510/175 |
| 2006/0193700 A1* | 8/2006 | Putnam et al. ................ 405/264 |

FOREIGN PATENT DOCUMENTS

| | | | |
|---|---|---|---|
| DE | CA2396051 | * 7/2002 | ............. A01N 37/40 |
| JP | H 08157819 | 5/1996 | |
| JP | H 10164976 | 6/1998 | |
| JP | H 11256160 | 9/1999 | |
| JP | 2000 144180 | 5/2000 | |
| JP | 200121841 | 9/2001 | |
| JP | 2005187415 | 7/2005 | |
| JP | 2006117774 | 5/2006 | |

OTHER PUBLICATIONS

Poloxamer 182 MSDS (http://www.sciencelab.com/msds.php?msdsld=9926609, cached google Oct. 2005).*

* cited by examiner

*Primary Examiner* — Mina Haghighatian
*Assistant Examiner* — Erin Hirt
(74) *Attorney, Agent, or Firm* — Joseph T. Guy; Perkins Law Firm, LLC

(57) ABSTRACT

The invention provides compounds having the general structure:

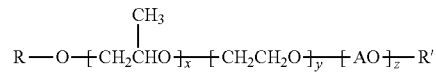

wherein R and R' are independently selected from the group consisting of H, $C_{1-24}$ alkyl, aryl, $C_{1-24}$ alkylaryl, aryl($C_{1-24}$)alkyl, —C(=O)—$R_1$ (esters), C(=O)—$NHR_1$ (urethanes), or C(=O)—O—$R_1$ (carbonates) wherein $R_1$ is selected from the group consisting of $C_{1-24}$ alkyl, aryl, $C_{1-24}$ alkylaryl, $C_{1-24}$ arylalkyl; A is an organic moiety derived from the group consisting of alkylene oxides having 4-12 carbon atoms and aryl epoxides having 8-12 carbon atoms; x=1-300; y=0-200; z=0-200; and with the proviso that R and R' can not be H or ether functionality at the same time. The compounds are useful for improving the water transport characteristics of hydrophobic surfaces.

6 Claims, No Drawings

METHOD FOR IMPROVING THE WATER TRANSPORT CHARACTERISTICS OF HYDROPHOBIC SURFACES

This application claims the priority benefit under 35 U.S.C. section 119 of U.S. Provisional Patent Application No. 60/897,047 entitled "Method For Improving The Water Transport Characteristics Of Hydrophobic Soils" filed Jan. 24, 2007, which is in its entirety herein incorporated by reference.

FIELD OF INVENTION

The present invention relates to novel non-ionic surfactants having desirable properties for improving the water transport characteristics of hydrophobic surfaces. This invention is also concerned generally with the treatment of hydrophobic surfaces, hydrophobic substrates and more specifically with the treatment of hydrophobic soils. The instant invention is directed to a new method for improving the water transport characteristics of hydrophobic surfaces and hydrophobic soils.

The present invention also relates to a method of enhancing water retention of soils and providing plant nutrients thereto over an extended period of time using certain random and block polypropylene oxide derivatives. Furthermore, the present invention generally relates to the use of certain random and block polypropylene oxide derivatives to enhance the infiltration of water and/or aqueous compositions through hydrophobic/water repellent soil. More particularly, the present invention relates to the use of certain random and block polypropylene oxide derivatives to rapidly improve the hydrophilicity of such soil.

The invention further relates to a new method for improving the water transport characteristics of hydrophobic soils. The applicants have found that the application of certain hydrophobic, water insoluble polymers or blends thereof, to hydrophobic soil or turf will improve the ability of water to penetrate the soil surface and infiltrate the treated layers of soil.

This invention also relates to a method of treating turf and soil to alleviate drought stress and soil capping and to improve water conservation in soil. The instant invention further relates to a method of promoting the transport of water through medium and coarse grained soils.

BACKGROUND OF THE INVENTION AND DESCRIPTION OF THE PRIOR ART

It is known that soil particles contain a large number of small channels or capillaries through which water is capable of flowing, and may be graded on the basis of the capillary or pore diameters. As water is made to flow through a channel, whether that channel be a soil pore or not, the rate of capillary water flow through the channel will be higher if the water is capable of wetting the channel surface. At the interface of the water and the capillary surface, however, there exists a long range van der Waal interaction between the water and the capillary surface. While the van der Waals interaction typically extends less than 200 angstroms into the body of water, it nonetheless decreases the ability of the water to wet the capillary surface, thereby increasing the contact angle between the water and the capillary surface and hindering the flow of water therethrough. While the negative effect of the van der Waals interaction may be negligible in the case of water flowing through a household pipe, when one considers the flow of water through minute soil pores, this interaction has a major effect.

Agronomists and farmers have to work with all types of plant growth media such as sand, natural earth, horticultural soils, and various soil-mimicking, soil-less plant culture substrates; however, the bane of essentially all agriculturalists is an hydrophobic/water repellent soil. Water repellent soil retards water infiltration into the soil matrix and often renders entire areas of the upper layers of the soil substrate essentially impervious to water penetration. Under rainfall or irrigation conditions, dire environmental consequences can result from the water repellency of the topsoil, such as surface runoff of water and aqueous compositions containing pesticides, this term inclusive of fertilizers, into pristine areas and/or potable reservoirs. Furthermore, and less obvious, are the serious consequences that result from aqueous pesticide flow through "fingers" that usually attend water repellent soil which can provide rapid transport of pesticide compositions to the local ground water table and thus increase the risk of ground water contamination.

The hydrophobicity/water repellency of a soil is not only a function of the initial water content of the soil, but is also a function of soil particle size (sands are more prone to water repellency than clays), as well as, type of organic matter incorporated in it. This organic matter induces water repellency in the soils in many ways, such as by providing hydrophobic organic substances leached from the plant litter; organic substances that have been irreversibly dried; and microbial by-products.

Before water will evenly infiltrate into or percolate through a soil matrix, there must be a continuous film of water on the soil particles. In other words, the soil must first be wetted before water will flow. In addition, getting the soil evenly wetted is of paramount importance to the healthy growth of plants or seeds which are to be grown in the soil. Thus, agriculturalists will often apply various wetting agent surfactant compositions directly to the soil.

Although an increasing number of researchers are aware of the occurrence and consequences of water repellency in a wide range of soils, it is still a neglected field in soil science. (Dekker et al., International Turfgrass Society Research Journal, Volume 9, 2001, pages 498-505)

It has been recognized for years that in water repellent soil significant spatial variability can occur both in soil water content and degree of water repellency. Agriculturalists have attacked the soil water repellency problem through the use of wetting agent surfactant compositions. The degree of efficacy among chemistries and formulations has varied significantly. Often, the amount of surfactant required to ameliorate water repellency and/or to enhance infiltration, either perform variably or in an attempt to improve performance, higher rates of wetting agents are applied, such elevated rates often becoming injurious to plants.

Hydrophobic soils can cause problems on golf courses and other turf areas, in nurseries and greenhouses, and in open fields. Golf course managers commonly report problems with localized dry spots on their greens. These dry spots become a serious turf management problem during the summer months, especially during periods of drought. Despite frequent irrigation, the soil in these spots resists wetting, resulting in patches of dead or severely wilted turf. The water applied wets the turf but does not adequately penetrate the soil surface to reach the root zone.

Nursery operators sometimes encounter hard-to-wet media in pots and greenhouse beds. Farmers who work organic soils often complain that the soil wets too slowly, reducing crop productivity. Problems with hydrophobic soils are also commonly associated with citrus production areas, with locations where mine spoils have been deposited, and with burned-over forestland and grassland.

If water cannot readily penetrate and wet the soil, the availability of moisture to plants is reduced, decreasing the germination rate of seeds, the emergence of seedlings, and the survival and productivity of crop plants. Lack of sufficient water in the soil also reduces the availability of essential nutrients to plants, further limiting growth and productivity. In addition, water that cannot penetrate the soil runs off the surface and increases soil erosion. Water repellency often occurs in localized areas. As a result, the soil wets nonuniformly, and dry spots occur.

In hydrophobic soils, the soil particles are apparently coated with substances that repel water, much like wax. In studies of localized dry spots in turf grass, the soil particles were found to be coated with a complex organic, acidic material that appeared to be the mycelium (growth structure) of a fungus.

Nonionic surfactants, or surface active wetting agents, reduce the surface tension of water, allowing the water molecules to spread out. When applied to water repellent soils in high concentrations, surfactants can improve the ability of water from rain or watering to penetrate the soil surface and thus increase the infiltration rate. However, most nonionic surfactants have significant water solubility and thus are rapidly removed by repeated rains or watering. In addition, most nonionic surfactants have one or more hydroxyl end groups that are easily oxidized or attacked by microbial agents, both of which reduce the durability of the treatment.

The prevention of dew formation on grass blades on managed grass and turf surfaces is also often desirable. The water drops present in dew provide needed moisture for the growth of fungal diseases of turf grasses. If the formation of dew is suppressed, the grass blades can dry out more quickly and thus the growth of fungal diseases can be minimized.

In dry periods, turf can be affected by drought stress. This can manifest itself in a number of ways, and in extreme cases the turf may die. Turf grass maintained on light soil, e.g. sand rootzone golf greens and links golf courses, is particularly prone to drought stress as is turf which is grown in generally poor soil conditions. Curiously, drought stress not only occurs in dry conditions, but also in relatively wet seasons due, for example, to rootbreaks, buried materials close to the surface, or through general inefficiency of an irrigation system.

Soils can also suffer drought stress. Thus, on heavy soils, one of the first signs of drought stress is that surface cracks appear on the soil. It will be appreciated that drought stress, in all its various forms, is undesirable and that it would be advantageous to avoid or reduce it.

So-called soil capping, i.e. crusting of the soil surface, can occur due to the pounding action of raindrops on soil. Capping can give rise to various problems, especially in seedbeds on light soils where it can prevent or reduce seedling emergence, thus resulting in a patchy, uneven sward. It would be desirable to be able to avoid soil capping, or at least reduce its effects.

Additionally, in many places water is becoming an ever decreasing resource, as is evidenced by dry rivers, low water tables and frequent restrictions on water usage. Further, in times of water shortage, it is often amenity users of water (e.g. golf courses etc.) where restrictions are enforced. It would, therefore be highly advantageous to be able to treat turf and soil so as generally to improve their water conservation so as to promote efficient use and minimize wastage.

It is also known that water conservation is a major issue in the United States and other countries, as water becomes an increasingly expensive commodity. Turf, particularly managed turf such as that located at golf courses, athletic fields, office parks and similar areas, uses large amounts of water. In past surveys by the Golf Course Superintendents Association of America (GCSAA), respondents indicated that irrigating an eighteen hole golf course in the U.S., having an average area of 77.7 irrigated acres, required an average of 28.5 million gallons of water each year. Of course the survey indicated regional differences in irrigation demand, with the Southwest US requiring 88 million gallons of water per year while the Mid-Atlantic states required 10 million gallons of water on average.

Among other problems faced in the areas of managed turf is localized dry spot caused by water-repellent soil conditions. Although this hydrophobic soil condition has several possible causes, researchers generally agree that the formation of an organic coating on the soil particles caused by the decomposition of plants and/or organisms causes the problem. The condition is characterized by irregular and isolated areas of problematic turf grass on the golf course, in the lawn or in other areas of turf.

The symptoms of localized dry spot are treated with surfactants, or surface-active agents. Some surfactants used to treat the condition are surfactant polymers. A surfactant polymer generally contains large segments or "blocks" of monomer which are hydrophobic in nature, attached to large blocks, which are hydrophilic in nature. Such surfactant polymers are generally referred to as "block copolymers" and give the polymer its surface-active nature. It is generally accepted that the hydrophobic portion of the surfactant molecule is attracted to the water repellent organic coating on the soil, whereas the hydrophilic portion of the surfactant remains readily accessible to water, thus allowing water to move into the soil profile, rather than running off of the surface.

A large number of surfactants are currently being marketed to manage localized dry spots. Such products are often marketed as soil wetters or wetting agents. Wetting agents are materials that increase the area that a droplet of a given volume of spray mixture will cover on a target. The management approach for using soil wetters and wetting agents generally involves direct application of the agents to the localized, problematic area, on an as needed basis, as part of an overall caring program.

In addition to surfactants, super-absorbing cross-linked polymers, including cross-linked polyacrylamides, have been used to treat localized dry spots. As the soil becomes wet, the cross-linked polymer absorbs water and holds it in the soil. Theoretically, the polymer continues to release stored water to the plant long after the soil would normally have dried. These cross-linked polymers can absorb and hold many times their weight in water.

U.S. Pat. No. 6,481,153 and U.S. Pat. No. 6,591,548 and U.S. Pat. No. 6,675,529 disclose soil additive formulations comprising humic acid redistribution (removal) compounds and methods for reducing water repellency within sandy soils by the application of these formulations. The humic acid redistribution compounds contain substituted succinic acid salts, a polycarboxylic acid salt, and a material to reduce the surface tension of a humic acid waxy coating.

U.S. Pat. No. 6,857,225 and U.S. Pat. No. 6,948,276 describe a soil additive formulation for reducing water repellency comprising a multi-branched wetting agent having an "oxygen-containing polyfunctional base compound and at least three surfactant branches attached thereto, wherein each surfactant branch includes both hydrophilic and hydrophobic constituents." The formulation also includes a secondary compound that actively lowers the surface tension of humic acid waxy coatings from hydrophobic sand particles. The '225 patent is a method for reducing localized dry spot formation by application of the additive formulation.

U.S. Pat. No. 6,948,276 is directed to a multi-branched regenerating wetting agents for treating sandy soils for long-term reduction of water repellency. Certain novel formulations of turf additives that act in such a manner as to permit proper amounts of moisture to contact root systems in order to reduce dry spots within highly managed turf areas and/or lawns. The inventive formulation comprising multi-branched surfactant compounds with both hydrophobic and hydrophilic constituents within each branch attached to an oxygen-containing polyfunctional base compound permits effective moisture penetration through such localized dry spots for sustained grass growth therein. Importantly, such multi-branched wetting agents provide sustained moisture penetration over a sustained period of time since the individual branches of such compounds may become dissociated from its base polyfunctional compound. Since such branches include both hydrophobic and hydrophilic constituents themselves, and thus act as wetting agents, even after degradation of the initial surfactant compound, long-term wetting and moisture penetration, at least, are permitted. Methods of treating sandy soils with such compounds and formulations thereof are also contemplated within this invention.

Thus, there is a continuing search and a long felt need for wetting agent compositions with increased wetting rate that are able to quickly penetrate and infiltrate the water repellent soil. The use of wetting agent compositions with increased wetting rates, in turn, will result in a more effective wetting of the root zone during rain events and/or irrigation applications, thereby, inducing better plant growth and decreased run-off. There is also an ongoing need for hydrophilic treatments for soils that are durable to repeated exposures to water and resist rapid oxidation and microbial attack. The treatment agent must also not harm plant life exposed to it.

OBJECTS OF THE INVENTION

It is a primary object of the present invention to provide novel non-ionic surfactants useful for treating hydrophobic soils.

It is another object of the present invention to provide a method of promoting the transport of water through medium and coarse grained soils by the use of economical quantities of a soil amendment.

It is a further object of the present invention to provide such a process where the soil amendment is also a composition characterized by a low washout rate from soil, thereby rendering the composition even more cost-effective.

It is also an object of the present invention to provide a method for improving the water transport characteristics of hydrophobic soils.

Still, another object of the invention is to provide certain random and block polypropylene oxide derivatives.

A further object of the invention is to provide certain random and block polypropylene oxide derivatives to enhance the infiltration of water and/or aqueous compositions through hydrophobic/water repellent soil.

It is a specific object of the present invention to provide certain hydrophobic, water insoluble polymers or blends thereof, to hydrophobic soil or turf to improve the ability of water to penetrate the soil surface and infiltrate the treated layers of soil.

A still further object of the invention is to provide a method of treating turf and soil to alleviate drought stress and soil capping and to improve water conservation in soil.

Other objects and embodiments of the present invention will be further discussed below.

SUMMARY OF THE INVENTION

The invention relates to a compound of the formula I:

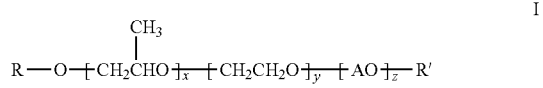

wherein R and R' are independently selected from the group consisting of H, $C_{1-24}$ alkyl, aryl, $C_{1-24}$ alkylaryl, $C_{1-24}$ arylalkyl, —C(=O)—$R_1$ (esters), C(=O)—$NHR_1$ (urethanes), or C(=O)—O—$R_1$ (carbonates) wherein $R_1$ is selected from the group consisting of $C_{1-24}$ alkyl, aryl, $C_{1-24}$ alkylaryl, $C_{1-24}$ arylalkyl; A is selected from the group consisting of alkylene oxides having 4-12 carbon atoms and aryl epoxides having 8-12 carbon atoms; x=1-300; y=0-200; z=0-200; and with proviso that R and R' can not be H or ether functionality at the same time.

The invention is also directed to a method for improving the water penetration rate through hydrophobic surfaces, inhibiting the formation of dew on grass, other plant surfaces, or other hydrophobic surfaces by applying an effective amount of a compound having the formula I as defined above.

The invention further provides a process for increasing the wetting rate of water repellent soil which comprises the steps of: (i) preparing an aqueous wetting agent composition comprising: (a) a compound of the formula I

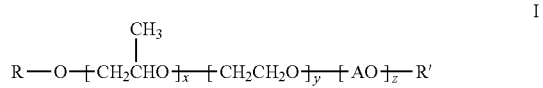

wherein R and R' are independently selected from the group consisting of H, $C_{1-24}$ alkyl, aryl, $C_{1-24}$ alkylaryl, $C_{1-24}$ arylalkyl, —C(=O)—$R_1$ (esters), C(=O)—$NHR_1$ (urethanes), or C(=O)—O—$R_1$ (carbonates) wherein $R_1$ is selected from the group consisting of $C_{1-24}$ alkyl, aryl, $C_{1-24}$ alkylaryl, $C_{1-24}$ arylalkyl; A is selected from the group consisting of alkylene oxides having 4-12 carbon atoms and aryl epoxides having 8-12 carbon atoms; x=1-300; y=0-200; z=0-200; and with proviso that R and R' can not be H or ether functionality at the same time; (b) a surfactant; and (c) water; and (ii) intimately contacting said water repellent soil with an effective amount of said wetting agent composition.

The instant invention also provides a process for rapidly increasing the hydrophilicity and infiltration of water into water repellent soil matrices. The process consists of applying to the water repellent soil an effective amount of a wetting agent composition comprising a compound of formula I.

The invention also provides a method for improvement and prevention of dry spots on the grass surface of a golf course comprising applying an effective amount of a compound of the formula I.

The compositions of the invention unexpectedly exhibit significantly enhanced infiltration (wetting) rates in water repellent soil over that previously achieved in the prior art.

DETAILED DESCRIPTION OF THE INVENTION

In the first aspect of the present invention, there is provided compounds of the formula I

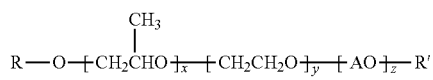

wherein R and R' are independently selected from the group consisting of H, $C_{1-24}$ alkyl, aryl, $C_{1-24}$ alkylaryl, aryl($C_{1-24}$)alkyl, —C(=O)—$R_1$ (esters), C(=O)—NH$R_1$ (urethanes), or C(=O)—O—$R_1$ (carbonates) wherein $R_1$ is selected from the group consisting of $C_{1-24}$ alkyl, aryl, $C_{1-24}$ alkylaryl, $C_{1-24}$ arylalkyl; A is selected from the group consisting of alkylene oxides having 4-12 carbon atoms and aryl epoxides having 8-12 carbon atoms; x=1-300; y=0-200; z=0-200; and with proviso that R and R' can not be H or ether functionality at the same time. The compounds of formula I may be random or block copolymers.

Of particular interest are compounds wherein x=10-100; y=0-50; and z=0-50; more preferably x=10-30; y=0-10; and z=0-10 and most preferably wherein x=18-21; y=1-2; and z=0-50. A particularly preferred compound is one wherein x≈19; y≈2; and z=0.

The compounds of formula I are prepared by reacting a polyoxypropylene oxide, $C_1$-$C_{24}$ alkyl ether with the required amount of 1,2 propylene oxide in the presence of potassium hydroxide in water solution at a temperature between 100° C. and 130° C. and more preferably at 120° C. After the initial reaction, the residual volatiles are removed by stirring under vacuum for 30 minutes at 120° C. Then, if required depending on the degree of ethoxylation one desires, ethylene oxide may be optionally added at 140° C. and allowed to react completely. Residual volatiles were again removed by stirring under vacuum for 30 minutes at 120° C. The temperature is then reduced to 60° C. and phosphoric acid is added and stirred for 30 minutes. The resulting product is typically a viscous clear oil having a MW in the range of approximately 1200-1800 and typically with a hydroxyl number in the range of 40.0-48.0.

The clear oil above, is then heated to a temperature between 80° C.-90° C. and then a fatty acid is added in the presence of p-toluenesulfonic acid. The mixture is heated to 180°-190° C. with a nitrogen sparge for 35-40 hours with water distillate being removed. The product ester is then cooled to 85°-90° C. and sodium carbonate is added and stirred for 1 hour. Subsequently, 50% hydrogen peroxide is added and allowed to stir for 1 hour. After heating to 100°-110° C., vacuum is applied and water was removed. The resulting mass is cooled to 50°-60° C. and filtered to remove suspended solids. The product is a viscous clear liquid having the desired acid values, hydroxyl number and saponification value.

As described above, after the alkoxylation of the polyoxypropylene oxide, $C_1$-$C_{24}$ alkyl ether, the alkoxylated alcohols formed as intermediate products are subjected to esterification. The carboxylic acid component used for this purpose is selected from linear or branched saturated and unsaturated fatty acids having 1 to 24 carbon atoms. The fatty acid chain may also be substituted with hydroxyl groups.

Typical examples of the fatty acid esterifying agents include lauric acid, myristic acid, palmitic acid, palmitoleic acid, stearic acid, isostearic acid, oleic acid, linoleic acid, linolenic acid, ricinoleic acid, 12-hydroxystearic acid, arachidonic acid, gadoleic acid, behenic acid, dimeric fatty acids, dimeric acids of the above fatty acids and erucic acid. Oleic acid, stearic acid and isostearic acid and technical mixtures thereof are preferred.

As usual in oleochemistry, these acids may also be present in the form of the technical cuts obtained in the pressure hydrolysis of natural fats and oils, for example palm oil, palm kernel oil, coconut oil, olive oil, sunflower oil, rapeseed oil or beef tallow. Saturated fatty acids containing 12 to 18 carbon atoms are preferred, those containing 16 to 18 carbon atoms being particularly preferred.

The esterification of the alkoxylated product derived from the alkoxylation of the polyoxypropylene oxide, $C_1$-$C_{24}$ alkyl ether, and formed as an intermediate product may also be carried out by methods known per se. Suitable acidic catalysts for this purpose are, for example, methanesulfonic acid, butanesulfonic acid, p-toluenesulfonic acid, naphthalenesulfonic acid, alkyl benzenesulfonic acid and/or sulfosuccinic acid.

In addition, it is advisable to carry out the esterification reaction at elevated temperatures, for example at temperatures of 140° to 275° C. and preferably 150° to 185° C. and continuously to remove the water of reaction from the equilibrium. The quantity of fatty acid used should be selected so that there are 1.0 to 1.2 and preferably 1.0 to 1.1 moles of fatty acid for every mole of the polyoxypropylene oxide, $C_1$-$C_{24}$ alkyl ether alkoxylate. This ensures that the esterification of the hydroxyl groups is substantially quantitative. If desired, a residual content of free fatty acid in the end reaction product may be neutralized with alkali metal hydroxide solution.

In another aspect, the invention is directed to a method for improving the water transport characteristics of hydrophobic surfaces and hydrophobic soils by applying to said surface or said soil and effective water transport improving amount of a compound of the formula

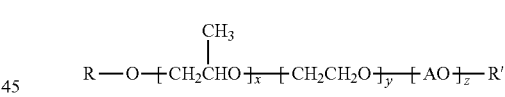

wherein R and R' are independently selected from the group consisting of H, $C_{1-24}$ alkyl, aryl, $C_{1-24}$ alkylaryl, aryl($C_{1-24}$)alkyl, —C(=O)—$R_1$ (esters), C(=O)—NH$R_1$ (urethanes), or C(=O)—O—$R_1$ (carbonates) wherein $R_1$ is selected from the group consisting of $C_{1-24}$ alkyl, aryl, $C_{1-24}$ alkylaryl, $C_{1-24}$ arylalkyl; A is selected from the group consisting of alkylene oxides having 4-12 carbon atoms and aryl epoxides having 8-12 carbon atoms; x=1-300; y=0-200; z=0-200; and with the proviso that R and R' can not be H or ether functionality at the same time. The compounds of formula I may be random or block copolymers.

Of particular interest are compounds wherein x=10-100; y=0-50; and z=0-50; more preferably x=10-30; y=0-10; and z=0-10 and most preferably wherein x=18-21; y=1-2; and z=0-50. A particularly preferred compound is one wherein x≈19; y≈2; and z=0.

The polymer of formula I, which itself is hydrophobic and water insoluble, may be applied directly to the hydrophobic surfaces or soils to render them hydrophilic. It may also be conveniently applied from an emulsion in water or from another convenient solvent or by means known in the art for ease of application.

The polymer of formula I may be emulsified in water with any of a number of emulsifiers. Preferred emulsifiers include nonionic surfactants, and especially preferred are nonionic ethylene oxide/propylene oxide block copolymers. A surface tension reducing additive may optionally be added to ensure adequate wetting of the hydrophobic surface or soil. Emulsifiers for soil application should be chosen so as not to damage turf or plant life.

The emulsion of the polymer of formula I may then be conveniently applied to the hydrophobic surface or soil by any of a number of methods including dipping, spraying, or wiping the emulsion onto the surface to be treated. After drying to remove the water vehicle, a coating of the inventive polymer remains on the treated surface rendering it hydrophilic. The hydrophilic coating is durable to repeated rinsings with water.

A thin coating of the polymer of formula I on the hydrophobic surfaces or soils is adequate to render it hydrophilic. Application of larger amounts of the polymer of formula I to a hydrophobic surface to make a thicker coating will not necessarily improve its hydrophilicity.

Amounts of the inventive polymer coating or emulsion necessary for adequate wettability of the hydrophobic surface or soil will vary with the desired level of hydrophilicity and depth of coverage. Moisture movement through treated soils will be improved according to the depth of treatment. Accordingly, the amount of dilution of the polymer of formula I with water and emulsifiers will best be determined by consideration of the depth of the root zone and the amount of diluted emulsion needed to percolate down to the desired depth. The concentration and volume of the emulsion of the inventive polymer may then be adjusted so that the volume of water and emulsion is sufficient to carry the polymer down to the desired depth to treat the soil particle surfaces.

Emulsifiers may be chosen to give best stability of the polymer of formula I in a concentrated form as well as in diluted form for application to hydrophobic surfaces or soils. Polymer of formula I can be diluted in water emulsion to 2% active ingredient or less for application to soil or to hydrophobic surfaces. The diluted solution may be applied to soil at a rate sufficient to allow treatment of the soil surface to a depth to encompass the entire turf root zone.

The treated hydrophobic surface becomes rapidly wettable by water, and will cause the treated surface to wick water (cause water to rise vertically up a treated surface). In the case of soils, the ability of water to penetrate soils is greatly increased. Dew formation on treated surfaces such as grass is also prevented.

The instant invention specifically relates to the discovery that wetting agent compositions comprising compounds of the formula I, significantly and unexpectedly enhance water and aqueous composition transport or infiltration through the solid matrices of hydrophobic/water repellent soil. Additionally, it has been found that these compositions are highly efficacious over a wide range of concentrations which is of critical importance in achieving maximum agronomic and/or hydrological benefit when the compositions are to be used in irrigation scenarios, e.g., both for the reduction in run-off and in the delivery of water soluble fertilizers.

Additionally, the compounds of formula I of the invention are formulated as an hydrophobic soil additive for treating sandy areas, soils, or areas including both sand and soil (such as lawns, greens, pastures, beaches, dry desert-like areas, and the like) for effective moisture penetration. The formulations of the invention are also used for reducing localized dry spot formation within lawns or greens by providing long-term wetting via single-application (and/or split applications spaced 7 to 10 days apart) formulations and treatments comprising the application of a soil additive formulation to a target lawn or green, wherein said soil additive formulation comprises the compounds of formula I as noted above.

The formulations containing the compounds of formula I and method of treating sandy areas with such formulations may thus be utilized for the provision of moisture penetration benefits in sandy areas alone. In such a manner, the sandy area (a beach, for example) may be modified to permit water penetration therein, to prevent unsightly water pools, for example, after raining, or to dry desert-like areas in order to permit water penetration to sustain root systems of plant-life which would not grow otherwise.

The inventive formulation may either be applied in liquid form, pellet form, or granular form to the selected treated area. The inventive formulation, in terms of composition, thus requires at least one compound having the formula I.

The compounds of formula I thus exhibit excellent ability to provide the necessary water adhesion to the hydrophobic surface of the water repellent soil via the hydrophobic groups of the surfactant itself and therefore provide the beneficial wetting characteristics and thus water transport, through the hydrophobic soil. Any adhered water droplets will be pulled into the sand and/or soil by further adhesion by other particles or through cohesion with other water droplets. Thus, such a wetting agent effectively permits appreciable and necessary amounts of moisture to penetrate the topsoil for beneficial moisture supply to the subterranean roots on a consistent and continuous basis for a relatively long period of time.

The soil additive formulation may be entirely comprised of such a wetting agent of formula I, in one potentially preferred embodiment, or the wetting agent(s) may be comprised of from 0.1-99% by weight of such a wetting agent of formula I; preferably from 1-99% by weight; more preferably from about 5-95% by weight; more preferably from about 10-90% by weight, with the remainder a mix of other additives as noted below.

However, in order to best ensure initial penetration of such wetting agents within the target topsoil areas, it is preferable to include at least one secondary compound within the formulation for further lowering of the surface tension at the topsoil surface which is also compatible with the aforementioned wetting agent having formula I. The lowering of the surface tension allows more rapid penetration of the wetter into the soil profile. Such a secondary compound can be an alkoxylated, preferably ethoxylated alcohol surfactant, such as a branched or unbranched $C_6$-$C_{60}$ alcohol ethoxylate or alkoxylated, preferably ethoxylated $C_8$-$C_{40}$ fatty acid for utilization in combination with the aforementioned wetting agent of formula I.

The alkoxylated secondary compounds may be branched or unbranched in configuration. Examples of preferred types of alcohol alkoxylates for this purpose include $C_6$-$C_{60}$ alkyl, or alkylaryl EO/PO surfactants, linear or branched, and secondary or primary hydroxyl in type, including mixtures of surfactants comprising from 95 to 1% by weight of at least one surfactant selected from polyalkylene oxide compounds with the general formula:

$$R_3-O-(C_2H_4O)_b(C_3H_6O)_c-R_3$$

wherein b is 0 to 500; c is 0 to 500, and $R_3$ is H, or an alkyl group with 1 to 4 carbon atoms; wherein the polyalkylene oxide has a molecular weight in the range of 300 to 51,000; and a second optional different surfactant comprising a compound of the general formula $$R_4-O-(CH_2CH_2O)_x(CHR_5CH_2O)_yR_6$$

wherein x is from 1 to 50; y is 0-50: $R_4$ is a branched or linear alkyl, alkenyl, aryl or an aryl group optionally having an alkyl group substituent, the alkyl group having up to 60 carbon atoms; $R_5$ is selected from H and alkyl groups having from 1 to 2 carbon atoms; and $R_6$ is selected from H and alkyl groups having from 1 to 30 carbon atoms. Suitable secondary surfactants also include carboxylic and dicarboxylic esters of the general formula:

$$R_4CO_a(CH_2CH_2O)_x(CHR_5CH_2O)_yCO_bR_6$$

wherein x is from 1 to 50; y is 1-50, a is from 1 to 2, b is from 1 to 2: $R_4$ is an alkyl or alkenyl group having up to 60 carbons or an aryl group optionally having an alkyl group substituent, the alkyl group having up to 60 carbon atoms; $R_5$ is selected from H and alkyl groups having from 1 to 2 carbon atoms; and $R_6$ is selected from H and alkyl groups having from 1 to 30 carbon atoms.

Additional secondary compounds can also be silicone surfactants or fluorosurfactants which are widely known by those skilled in the art to reduce surface tension.

The preferred surfactants/emulsifiers to be used in combination with the compounds of formula I are selected from the group consisting of random and block EO-PO copolymers, random and block EO-PO-EO copolymers, random and block PO-EO-PO copolymers, $R-EO_x-PO_y-$ and $R-PO_y-EO_x$, $R-(CH_2CH_2O)_xOH$, $R-SO_3{}^-M^+$, $R-(CH_2CH_2O)_xOSO_3{}^-M^+$, $(RO)_xP(=O)O^-M^+$, $RCO_2{}^-M^+$, or $ROSO_3{}^-M^+$, $RR'R''R'''N^+X^-$ wherein $R=C_{1-24}$ alkyl or alkylaryl, $(C_1-C_{24})-(C=O)-$, R, R', R'', R''' may be the same or different and are selected from the group consisting of alkyl, aryl, or alkylaryl, and mixtures thereof.

The compounds of formula I can also prevent development of dry spots on the grass surface of a golf course and also improve and reduce already developed dry spots by sprinkling said compound along with a carrier on the grass surface of a golf course.

The reason why the compounds of formula I can prevent or improve dry spots is believed to be as follows: when said compound is sprinkled on water repellent soil, the oxygen atoms of the polyoxypropylene section of the polymer hydrogen bond with water molecules to accelerate permeation of water into the water repellent soil and this is believed to be the reason why development of dry spots is prevented for a long duration of time.

It is also anticipated that the compositions of the instant invention be utilized in solid form, e.g., powder or granular form, by either being added to inert filler material and/or blended with fillers and additives in methods well known by those skilled in the agrochemical water dispersible or dry spreadable art. In this way, the compositions are able to be delivered in solid form to the water repellent soil and controlled release of the compositions can be achieved if one so desires.

Example I

Manufacture of Rewetting Agent

Polyoxypropylene oxide, monobutyl ether (MW 340), 4181 parts, and 71 parts of 45% potassium hydroxide in water solution were combined and heated to 120° C. After purging of oxygen and removal of water, 9900 parts of 1,2-propylene oxide was added and allowed to completely react. Residual volatiles were removed by stirring under vacuum for 30 minutes at 120° C. Ethylene oxide, 920 parts, was then added at 140° C. and allowed to react completely. Residual volatiles were again removed by stirring under vacuum for 30 minutes at 120° C. The temperature was reduced to 60° C. and 44 parts of phosphoric acid were added and stirred for 30 minutes. The product was a viscous clear oil of approximately 1200 MW (hydroxyl number 47.4).

This clear oil, 14830 parts, was heated to 80° C. and then 2740 parts of stearic acid and 27 parts of p-toluenesulfonic acid were added. The mixture was heated to 180°-190° C. with a nitrogen sparge for 37 hours with water distillate being removed. The product ester was cooled to 85°-90° C. and 88 parts of sodium carbonate was added and stirred for 1 hour. Nine parts of 50% hydrogen peroxide was added and allowed to stir for 1 hour. After heating to 100°-110° C., vacuum was applied and water was removed. The mass was cooled to 50°-60° C. and filtered to remove suspended solids. The product was a viscous clear liquid with an acid value of 0.9 mg KOH/g, hydroxyl number of 8.5 mg KOH/g, and a saponification value of 31.8 mg KOH/g.

Example II

Manufacture of Rewetting Agent

Another rewetting agent similar to the product of Example I was prepared by the same procedure of Example I with the exception of no addition of ethylene oxide. The product ester had an acid value of 10.49, hydroxyl value of 22.1, and saponification value of 80.5.

Example III

Application of Example I to Impart Hydrophilicity to a Hydrophobic Surface

1) A solution of 2.1% Example I and 97.9% anhydrous isopropanol was prepared. (Example I is soluble in IPA in all proportions.)
2) This solution was applied to a finish-free polypropylene fabric by a dip method so that the wet-pick-up of the fabric was 100% (Example III-2). As a control (Example III-1), a swatch of unfinished fabric was dipped into isopropyl alcohol (IPA) that had nothing dissolved in it.
3) The alcohol was subsequently evaporated from the fabrics by suspending them in an ambient air flow for 24 hours, leaving 2% by weight of the Example I polymer on the test fabric and none on the control.
4) The wettability of the fabric was then tested by gently applying a droplet of water to the surface of the fabric and observing the time required for complete absorption of the droplet.

TABLE 1

|  | Examples | |
| --- | --- | --- |
|  | III-1 | III-2 |
| Example 1 product | 0 | 2.1% |
| isopropyl alcohol | 100% | 97.9% |
| Wet pick up | 100% | 100% |
| Amount Example I deposited | 0% | 2.1% |
| Time to absorbance of water droplet | no absorption within 10 minutes | <1 sec |

Example III-1 confirms that the untreated polypropylene fabric was very hydrophobic and not water wettable. Example III-2 shows that the treated fabric is rapidly water wettable.

Examples IV-1 to IV-7

Emulsions of Example I in Water

Various surfactants were blended with Example I and were evaluated by observing the stabilities of the mixtures under ambient and freeze-thaw conditions. These mixtures were then mixed into water at 2% by weight of the mixtures and the stability of the water emulsions observed. The blends and their stabilities are recorded in Table 2.

Materials
Ethal LA-23 polyoxyethylene (POE) 23 lauryl alcohol
Ethal TDA-6 POE 6 tridecyl alcohol
Ethox 2672 Methoxy polyoxyethylene glycol 360 monolaurate
POP(3)CSA polyoxypropylene (POP) 3 cetyl-stearyl alcohol
Ethox 1437 POP(2) POE(4) decyl alcohol
Ethox 1449 POP (7.2) POE(5.8) decyl alcohol
Ethox 2400 POP (2) POE(9) tridecyl alcohol
Ethox 2440 POP (5) POE(5) octyl/decyl alcohol
Ethox 2680 POE (7) POP(3) octyl/decyl alcohol
Ethox L-61 POE-POP-POE block polymer with 10% EO and molecular weight 2000
Ethox L-62 POE-POP-POE block polymer with 20% EO and molecular weight 2200
Ethox L-64 POE-POP-POE block polymer with 40% EO and molecular weight 3000
Ethal NP-9 POE 9 nonylphenol

TABLE 2

|  | Examples | | | | | | |
| --- | --- | --- | --- | --- | --- | --- | --- |
|  | IV-1 % | IV-2 % | IV-3 % | IV-4 % | IV-5 % | IV-6 % | IV-7 % |
| Example I | 75 | 75 | 75 | 75 | 75 | 75 | 75 |
| Emulsifiers | | | | | | | |
| Ethox 2672 | 0 | | | | | | |
| Ethox 1437 | 25 | | | | | | |
| Ethox 1449 | | 25 | | | | | |
| Ethox 2400 | | | 25 | | | | |
| Ethox 2440 | | | | 25 | | | |
| Ethox 2680 | | | | | 25 | | |
| Ethox L-61 | | | | | | 25 | |
| Ethox L-62 | | | | | | | 25 |
| Stability of concentrate - ambient | Clear | Clear | Clear | Clear | Clear | Clear | Clear |
| Stability of concentrate - 15 C. | Haze | Haze | Separation | Separation | Good | Good | Good |
| Stability of concentrate - freeze/thaw | Haze | Haze | Separation | Separation | Separation | Separation | Good |
| Appearance of 2% aqueous solution | Emulsion | Dispersion | Dispersion | Dispersion | emulsion | Dispersion | Fine dispersion |
| 24 hour appearance of 2% solution | Emulsion | Creams | Creams | Creams | Creams | Creams | Fine dispersion |

Table 2 shows that the Example I polymer may be emulsified with several surfactants, but that Ethox L-62 (Example IV-7) gave the best combination of storage stability and emulsion stability.

Examples IV-8 to IV-15

Emulsions of Example I in Water

Various surfactants were blended with Example I and were evaluated by observing the stability of the mixtures under low temperature and freeze-thaw conditions. The blends and their stabilities are recorded in Table 3.

These mixtures were then mixed into water at 2% by weight of the mixture and applied to the same unfinished polypropylene fabric that was used in Example III by a dip method so that the wet-pick-up of the fabric was 1%. The fabrics were then dried by suspending them in an ambient air flow for 24 hours.

The hydrophilicity of the treated fabrics was evaluated by timing the absorbance of a droplet of water as in Table 1.

TABLE 3

|  | Examples | | | | | | | |
| --- | --- | --- | --- | --- | --- | --- | --- | --- |
|  | IV-8 % | IV-9 | IV-1 | IV-11 | IV-12 | IV-13 | IV-14 | IV-15 |
| Example I | 75 | 75 | 75 | 75 | 75 | 75 | 75 | 75 |
| Emulsifiers | | | | | | | | |
| Ethox L-61 | 25 | 2 | 12 | 5 | 2 | | | |
| POP(3)CSA | | 5 | 13 | 2 | | | | |
| Ethox 268 | | | | | 5 | | | |
| Ethox L-62 | | | | | | | 25 | 12.5 |
| Ethox L-64 | | | | | | 25 | | 12.5 |
| Ethal LA-23 | | | | | | | | |
| Ethal TDA-6 | | | | | | | | |
| Ethox 2672 | | | | | | | | |

TABLE 3-continued

| | Examples | | | | | | |
|---|---|---|---|---|---|---|---|
| | IV-8 % | IV-9 | IV-1 | IV-11 | IV-12 | IV-13 | IV-14 | IV-15 |
| Cold stability (15° C.) of concentrate | good | good | poor | poor | good | poor | good | poor |
| Freeze/Thaw (° C. overnight/thaw) Of concentrate | good | moderate | poor | poor | moderate | poor | good | poor |
| Wetting time of treated fabric | 2 sec | 3 sec | >6 sec | >6 sec | 4 sec | >6 sec | 1-2 sec | 4 sec |

Table 3 shows that polypropylene fabric treated with a number of emulsions formed from Example I with various surfactants becomes water wettable. Examples IV-8 and IV-14 gave excellent performance.

Example V

Durability of Hydrophilic Treatment

The mixtures in Table 3 were made and tested by the procedure outlined below and the durability test results are included in Table 5.

1) Dissolve the blends of Example I with surfactant(s) in isopropyl alcohol at a 2% level. Application of the inventive material and the emulsifiers was made from isopropyl alcohol to eliminate possible variations in durability due to uneven application from water dispersions.
2) Apply at 1% wpu (2% solid add-on) onto six 13 cm×13 cm polypropylene woven fabric swatches
3) Dry 12 hours in air-flow of hood
4) Drop water droplet onto fabric and time for full absorption into fabric
5) Store the tested swatch
6) Rinse all of the remaining fabric swatches by immersing in ambient tap water and stirring for 60 seconds
7) Dry them in the air flow of a hood.
8) Drop water onto one swatch and measure absorption time.
9) Store one of the tested swatches.
10) Rinse the remainder of the swatches a second time.
11) Dry them in the air flow of a hood.
12) Drop-test one of the twice-rinsed swatches and store it.
13) Rinse the rest of the swatches a third time.
14) Dry them in the air-flow of a hood.
15) Drop-test one of the thrice-washed swatches and store it
16) Repeat steps 13, 14 and 15 for the fourth, fifth and sixth rinses and tests

TABLE 4

Composition of Examples V-A through V-E

| | Examples | | | | |
|---|---|---|---|---|---|
| | V-A | V-B | V-C | V-D | V-E |
| Example I | 1.5% | 1.5% | 1.5% | | |
| L-61 | .5% | | | | |
| L-62 | | .5% | | 0.5% | |
| LA-23 | | | .255% | | |
| TDA-6 | | | .255% | | |
| NP-9 | | | | | .5% |
| Isopropyl Alcohol | 98 | 98 | 98 | 99.5 | 99.5 |

TABLE 5

Wetting times of polypropylene fabric treated with Example V solutions

| Treatment stage | Sample V-A Wet time (seconds) | Sample V-B Wet time (seconds) | Sample V-C Wet time (seconds) | Sample V-D Wet time (seconds) | Sample V-E Wet time (seconds) |
|---|---|---|---|---|---|
| As treated | Instant | Instant | Instant | 1.38 sec | Instant |
| 1 rinse | Instant | Instant | Instant | 149.9 sec | Instant |
| 2 rinses | 1.5 sec. | 1.32 sec | 2.6 sec | 3+ sec | 89.67 sec |
| 3 rinses | 1.8 sec. | 1.69 sec | 2.22 sec | (no penetration) | 3+ sec |
| 4 rinses | 2.57 sec. | 2.2 sec | 2.97 sec | (no penetration | (no penetration |
| 5 rinses | 3.2 sec. | 2.89 sec | 3.94 sec | (no penetration | (no penetration |

The results from Examples V-A, B and C show that the blends of Example I with three surfactant blends impart wettability and that it is durable to multiple rinsings. The blend with L-62 is slightly better than the other two.

The result from Example V-D indicates that the L-62 emulsifying surfactant does not contribute to the durability of the performance. Example V-E shows that polypropylene fabric treated with a common industry wetting agent shows rapid wetting, but the hydrophilicity is not durable to repeated rinsings.

All patents, patent applications and publications cited in this application including all cited references in those applications, are hereby incorporated by reference in their entirety for all purposes to the same extent as if each individual patent, patent application or publication were so individually denoted.

While the many embodiments of the invention have been disclosed above and include presently preferred embodiments, many other embodiments and variations are possible within the scope of the present disclosure and in the appended claims that follow. Accordingly, the details of the preferred embodiments and examples provided are not to be construed as limiting. It is to be understood that the terms used herein are merely descriptive rather than limiting and that various changes, numerous equivalents may be made without departing from the spirit or scope of the claimed invention.

What is claimed is:

1. A method from improving the water penetration rate through soils selected from the group consisting of agricultural soils and golf course soils, said method consisting essentially of the application of an effective amount of a formulation consisting essentially of:
   (1) a compound not having emulsifying properties and having the formula:

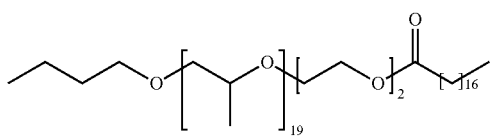

and
   (2) a POE-POP-POE block copolymer emulsifier with 20% EO and molecular weight 2200; and wherein said emulsifier provides storage stability and emulsion stability.

2. The method of claim 1 in which the compound is present in a physical form selected from the group consisting of a liquid, a pellet, and a grain.

3. A method for inhibiting the formation of dew on grass, other plant surfaces, and soils selected from the group consisting of agricultural soils and golf course soils, said method consisting essentially of the application of a formulation consisting essentially of:
   (1) an effective amount of a compound not having emulsifying properties and having the formula:

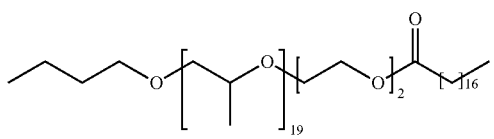

and
   (2) a POE-POP-POE block copolymer emulsifier with 20% EO and molecular weight 2200; and wherein said emulsifier provides storage stability and emulsion stability.

4. A process for increasing the wetting rate of water repellant soils selected from the group consisting of agricultural soils and golf course soils which method consists essentially of the steps of: (i) preparing an aqueous wetting agent consisting essentially of: (a) a compound not having emulsifying properties and having the formula:

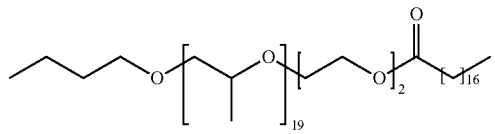

and
   (b) a POE-POP-POE block copolymer emulsifier with 20% EO and molecular weight 2200; and wherein said emulsifier provides storage stability and emulsion stability
   (c) an aqueous or non-aqueous solvent; and
(ii) intimately contacting said water repellent soil with an effective amount of said wetting agent composition such that the compound of formula I will provide a measurable increase in the wetting rate of the soil.

5. A compound not having emulsifying properties and having the formula:

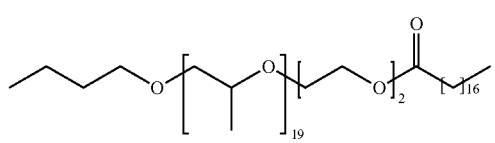

6. A method for the improvement and reduction of dry spots on the grass surface of a golf course, said method consisting essentially of applying an effective amount of a formulation consisting essentially of:
   (1) a compound not having emulsifying properties and having the formula:

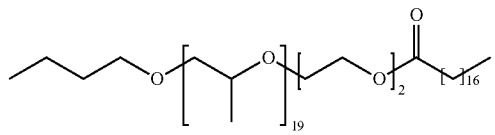

and
   (2) a POE-POP-POE block copolymer emulsifier with 20% EO and molecular weight 2200; and wherein said emulsifier provides storage stability and emulsion stability.

* * * * *